United States Patent
Shin et al.

(10) Patent No.: US 8,391,414 B2
(45) Date of Patent: Mar. 5, 2013

(54) METHOD AND APPARATUS FOR TRANSMITTING AND RECEIVING SPACE BLOCK CODING SIGNAL THROUGH ITERATIVE MULTI-USER DETECTION

(75) Inventors: Chang Yong Shin, Seoul (KR); Eung Sun Kim, Suwon-si (KR); Young-Doo Kim, Seoul (KR); Gi Hong Im, Pohang-si (KR); Jong Bu Lim, Pohang-si (KR); Chan ho Choi, Pohang-si (KR)

(73) Assignees: Samsung Electronics Co., Ltd., Suwon-si (KR); Postech Academy-Industry Foundation, Pohang-si (KR)

(*) Notice: Subject to any disclaimer, the term of this patent is extended or adjusted under 35 U.S.C. 154(b) by 656 days.

(21) Appl. No.: 12/180,572

(22) Filed: Jul. 28, 2008

(65) Prior Publication Data

US 2009/0092182 A1    Apr. 9, 2009

(30) Foreign Application Priority Data

Oct. 5, 2007  (KR) .................. 10-2007-0100652

(51) Int. Cl.
*H03K 9/00*     (2006.01)

(52) U.S. Cl. ........ 375/316; 375/232; 375/230; 375/229; 375/259; 375/260

(58) Field of Classification Search ............. 375/316, 375/232, 230, 229, 259, 260
See application file for complete search history.

(56) References Cited

U.S. PATENT DOCUMENTS

| | | | |
|---|---|---|---|
| 7,092,450 B1 * | 8/2006 | Al-Dhahir | 375/267 |
| 7,190,734 B2 * | 3/2007 | Giannakis et al. | 375/267 |
| 7,697,906 B2 * | 4/2010 | Himayat et al. | 455/127.1 |
| 2003/0003880 A1 * | 1/2003 | Ling et al. | 455/92 |
| 2003/0072291 A1 * | 4/2003 | Brunel | 370/342 |
| 2003/0073464 A1 | 4/2003 | Giannakis et al. | |
| 2004/0132416 A1 * | 7/2004 | Yee | 455/82 |
| 2004/0190603 A1 * | 9/2004 | Dabak et al. | 375/148 |
| 2005/0128966 A1 * | 6/2005 | Yee | 370/310 |
| 2005/0249269 A1 | 11/2005 | Tomasin et al. | |
| 2006/0215541 A1 * | 9/2006 | Kwun et al. | 370/208 |
| 2007/0297495 A1 * | 12/2007 | Visoz et al. | 375/148 |
| 2008/0151831 A1 * | 6/2008 | Khan et al. | 370/330 |

FOREIGN PATENT DOCUMENTS

| | | |
|---|---|---|
| JP | 2003-110530 | 4/2003 |
| JP | 2006-287490 | 10/2006 |
| KR | 10-2006-0102185 | 9/2006 |
| KR | 10-2007-0040675 | 4/2007 |
| KR | 10-2007-0071713 | 7/2007 |
| WO | WO 99-23795 | 5/1999 |

* cited by examiner

*Primary Examiner* — Kenneth Lam
(74) *Attorney, Agent, or Firm* — NSIP Law

(57) ABSTRACT

A method and apparatus for transmitting and receiving a space block coding signal through Iterative Multi-user Detection is provided. The apparatus includes a multi-user interference cancellation unit which cancels multi-user interference in a received signal and outputs a first signal and a second signal that are sequentially transmitted from two transmitting antennas, a linear combiner which performs linear combination for the first signal and the second signal, and an equalizer which applies different equalization coefficients to the combined first signal and the second signal, respectively, to perform frequency-domain equalization.

20 Claims, 6 Drawing Sheets

METHOD AND APPARATUS FOR TRANSMITTING AND RECEIVING SPACE BLOCK CODING SIGNAL THROUGH ITERATIVE MULTI-USER DETECTION

CROSS-REFERENCE TO RELATED APPLICATION

This application claims the benefit under 35 U.S.C. §119 (a) of a Korean Patent Application No. 10-2007-100652, filed on Oct. 5, 2007, in the Korean Intellectual Property Office, the entire disclosure of which is incorporated herein by reference.

TECHNICAL FIELD

The following description relates to a communication system using Space Time Block Coding (STBC) or Space Frequency Block Coding (SFBC), and more particularly, to methods and apparatuses for transmitting and receiving a space block coding signal through Iterative Multi-user Detection using a frequency-domain equalizer (FDE) in a single-carrier communication system.

BACKGROUND

A single-carrier communication system using a frequency-domain equalizer (DFE) has the similar structure as an orthogonal frequency division multiplexing (OFDM) system. In an aspect of performance, the characteristic of the single-carrier communication system is similar to the OFDM system. However, in the case of the OFDM system, non-linear distortion may occur due to a peak-to-average power ratio (PAPR), causing spectrum spread to an adjacent band and deterioration in quality of a signal.

The single-carrier communication system using the DFE is gaining the attention as uplink transmission technology of a next generation wireless communication system that may solve the above problems.

However, multi-user interference may limit bit error performance and cell capacity in a multi-user environment where the same time and frequency resources are shared by a plurality of users. In particular, where the same resource is used between cells, users in a cell boundary region may be exposed to the multi-user interference.

Currently, in order to solve the multi-user interference, transmission diversity technology that may spatially dispose a plurality of transmitting antennas and thereby improve link reliability, such as a Space Time Block Coding (STBC) system and a Space Frequency Block Coding (SFBC) system, is proposed. However, in the conventional art, since a single transmitting antenna is used in each user terminal, it may be impossible to obtain transmission diversity gain that may spatially dispose a plurality of transmitting antennas and thereby improve the link reliability.

Accordingly, there is a need for a method and apparatus for transmitting and receiving a spatial block coding signal that may detect multi-user interference and remove the detected multi-user interference and thereby effectively obtain the transmission diversity gain.

SUMMARY

In one general aspect, there is provided a method and apparatus for transmitting and receiving a space block coding signal that detects multi-user interference through Iterative Multi-user Detection and removes the detected multi-user interference.

In another general aspect, there is provided a method and apparatus for transmitting and receiving a space block coding signal that effectively obtains transmission diversity gain through Iterative Multi-user Detection and frequency-domain equalization.

In still another general aspect, an apparatus for receiving a Space-Time Block Coding (STBC) encoded signal includes a multi-user interference cancellation unit which cancels multi-user interference in a received signal and outputs a first signal and a second signal that are sequentially transmitted from two transmitting antennas, a linear combiner which performs linear combination for the first signal and the second signal; and an equalizer which applies different equalization coefficients to the combined first signal and the second signal, respectively, to perform frequency-domain equalization.

In yet another general aspect, an apparatus for receiving a Space-Frequency Block Coding (SFBC) encoded signal includes a multi-user interference cancellation unit which cancels multi-user interference in received signal, and outputs an even frequency component and an odd frequency component that are transmitted from two different transmitting antennas, a linear combiner which performs linear combination for the even frequency component and the odd frequency component, and an equalizer which applies different equalization coefficients to the combined even frequency component and the odd frequency component, respectively, to perform frequency-domain equalization.

In a further another general aspect, the apparatus may further include a re-encoder which performs STBC encoding for recovered data to provide the STBC encoded signal to the multi-user interference cancellation unit. The recovered data may be generated from an output signal of the equalizer.

In a further another general aspect, the apparatus may further include a re-encoder which performs SFBC encoding for recovered data to provide the SFBC encoded signal to the multi-user interference cancellation unit. The recovered data may be generated from an output signal of the equalizer.

In still another general aspect, a method of receiving an STBC encoded signal includes removing a cyclic prefix (CP) in a received signal, performing fast Fourier transform (FFT) for the signal in which the CP is removed, canceling multi-user interference in the fast Fourier transformed signal using recovered data corresponding to the received signal, to output a first signal and a second signal that are sequentially transmitted from two transmitting antennas, applying different equalization coefficients to the first signal and the second signal, respectively, to perform frequency-domain equalization, and recovering transmission data from a resulting signal of the frequency-domain equalization.

In still another general aspect, a method of receiving a SFBC encoded signal includes removing a CP in a received signal, performing FFT for the signal in which the CP is removed, canceling multi-user interference in the fast Fourier transformed signal using recovered data corresponding to the received signal, to output an even frequency component and an odd frequency component that are transmitted from two different transmitting antennas, applying two different equalization coefficients to the even frequency component and the odd frequency component to perform frequency-domain equalization, and recovering transmission data from a resulting signal of the frequency-domain equalization.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION OF EXEMPLARY EMBODIMENTS

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions are omitted to increase clarity and conciseness.

Notations used herein may be defined as follows: g denotes a weight vector in a time domain and G denotes a weight vector in a frequency domain. $\hat{x}$ denotes an estimate vector in the time domain and $\hat{X}$ denotes an estimate vector in the frequency domain. $x(n)$ denotes an $n^{th}$ element of vector x. $(.)^*$ denotes a conjugate. $(.)^T$ denotes a transpose. $(.)^H$ denotes a conjugate transpose. $(.)_N$ denotes a modulo-N.

Figure 1:
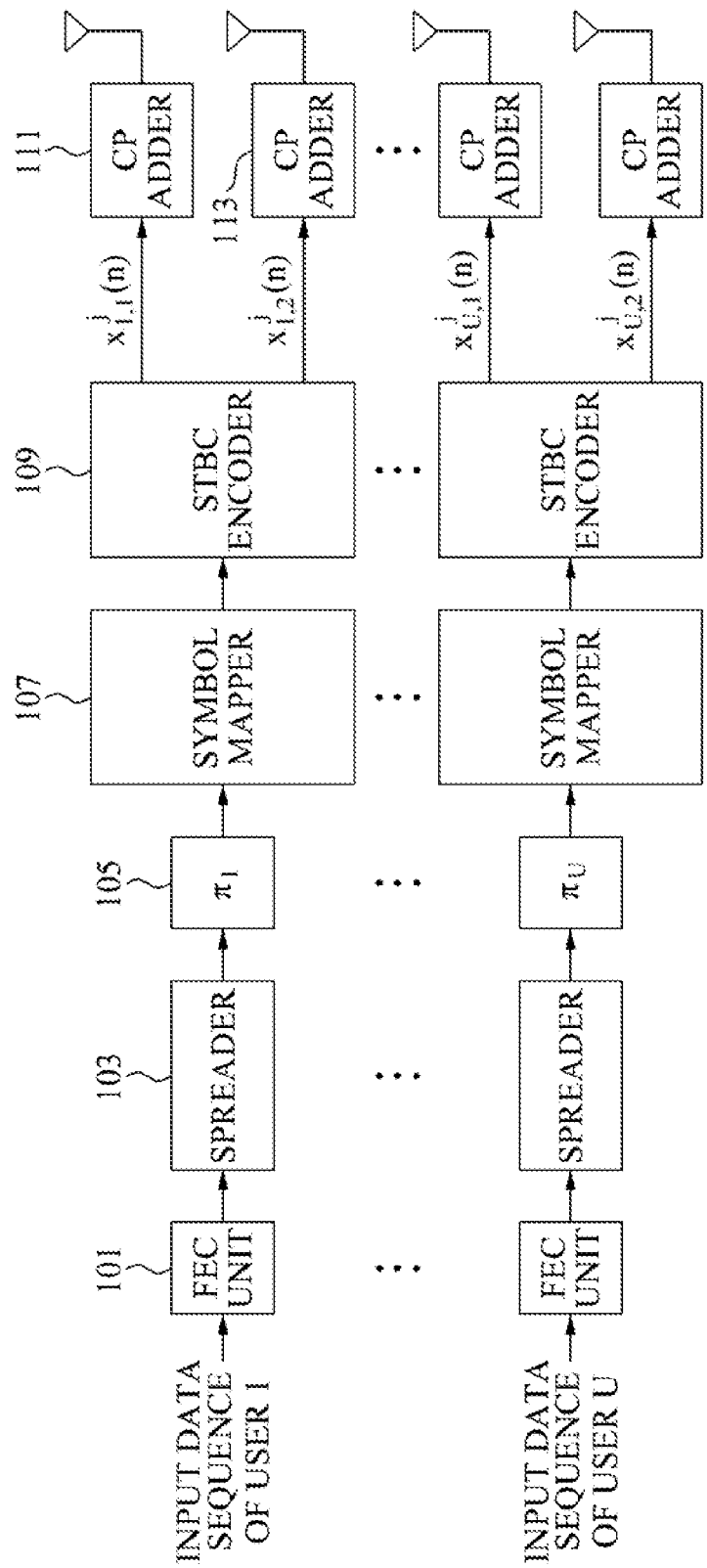
FIG. 1 is a block diagram illustrating an exemplary structure of a Space Time Block Coding (STBC) transmitter.

FIG. 1 illustrates an exemplary structure of a Space Time Block Coding (STBC) transmitter.

In FIG. 1, U users may perform STBC encoding for input data sequences 1 through U using the STBC transmitter with two transmitting antennas, respectively.

Referring to FIG. 1, the STBC transmitter comprises a forward error correction (FEC) unit 101, a spreader 103, an interleaver $\pi_1$ 105, a symbol mapper 107, an STBC encoder 109, and cyclic prefix (CP) adders 111 and 113. The FEC unit may perform FEC coding for the input data sequence. The spreader 103 may spread the FEC coded bits. The interleaver $\pi_1$ 105 may interleave the spread bits. The symbol mapper 107 may perform symbol mapping for the interleaved bits. The STBC encoder 109 may perform STBC encoding for a symbol mapped signal. The CP adders 111 and 113 may add a CP to the STBC encoded symbol.

The input data sequence may be FEC coded and then be spread by sequence [1, −1, ..., 1, −1] with the length of S. Next, the spread bits may be mapped into $2^M$-phase shift keying (PSK) symbol or $2^M$-quadrature amplitude modulation (QAM) symbol with the length of N and then be encoded into two streams associated with STBC constellations by the STBC encoder 109. N may be the size of fast Fourier transform (FFT). In the following description, $\{x_{u,i}^m(n)\}_{n=0}^{N-1}$ may denote an $m^{th}$ symbol block that is transmitted from an $i^{th}$ antenna of a $u^{th}$ transmitter.

$m^{th}$ symbol blocks $\{x_{u,1}^m(n)\}_{n=0}^{N-1}$ and $\{x_{u,2}^m(n)\}_{n=0}^{N-1}$ may be generated by an information source. $(m+1)^{th}$ symbol blocks $\{x_{u,1}^{m+1}(n)\}_{n=0}^{N-1}$ and $\{x_{u,2}^{m+1}(n)\}_{n=0}^{N-1}$ may be given by, $$\{x_{u,1}^{m+1}(n)\}_{n=0}^{N-1} = \{-x^*_{u,2}{}^m(-n)_N\}_{n=0}^{N-1},$$

$$\{x_{u,2}^{m+1}(n)\}_{n=0}^{N-1} = \{x^*_{u,1}{}^m(-n)_N\}_{n=0}^{N-1}. \quad \text{[Equation 1]}$$

The CP adders 111 and 113 may add a CP with the length of L to a front end of a transmission block in order to avoid interblock interference. Transmission blocks with the added CP may be transmitted from two antennas via a channel. It is assumed herein that the channel is the same as a time slot with respect to two consecutive blocks.

Figure 2:
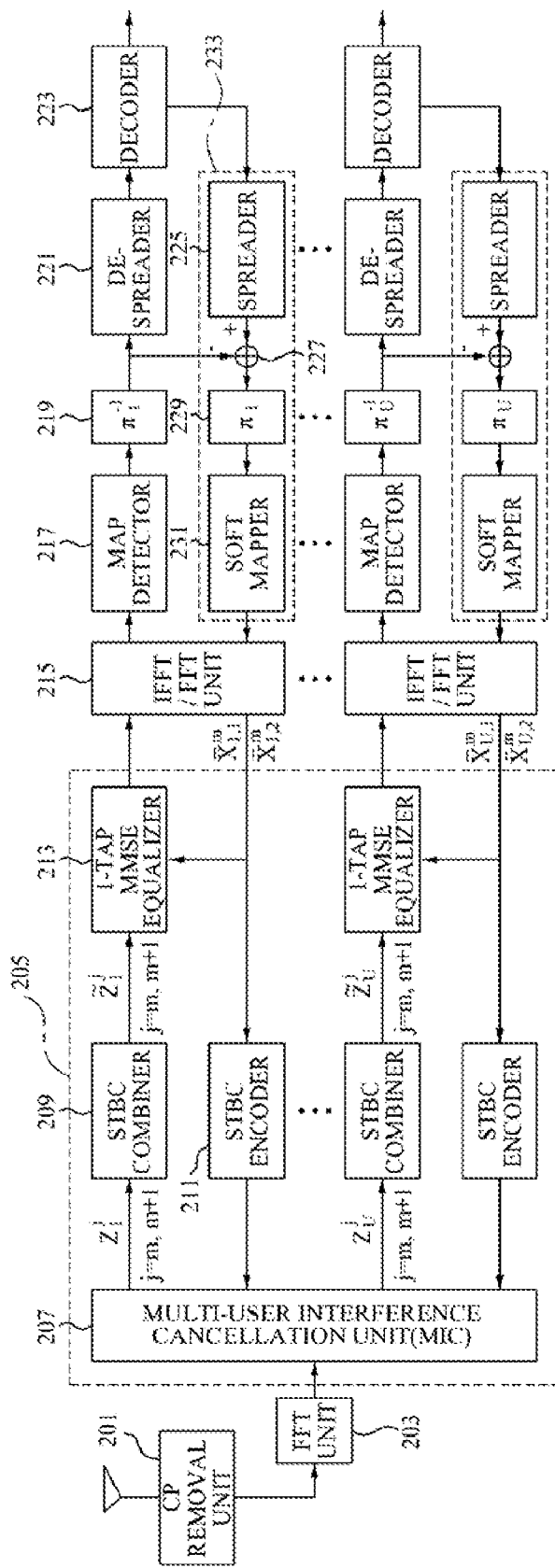
FIG. 2 is a block diagram illustrating an exemplary structure of an STBC receiver.

FIG. 2 illustrates an exemplary structure of an STBC receiver.

Referring to FIG. 2, the STBC receiver comprises a CP removal unit 201, an FFT unit 203, an Interactive Multi-user Detection-Frequency Domain Equalization (IMD-FDE) performing unit 205, an inverse fast Fourier transform (IFFT)/FFT unit 215, a map detector 217, a de-interleaver $\pi_1^{-1}$ 219, a de-spreader 221, and a decoder 223.

The CP removal unit may remove a CP in a received signal. The FFT unit 203 may perform FFT for the signal in which the CP is removed. The IMD-FDE performing unit 205 may remove multi-user interference in the FFT signal to detect a transmission data. The IFFT/FFT unit 215 may perform IFFT for the detected transmission data. The map detector 217 may detect symbol mapping from the IFFT signal. The de-interleaver $\pi_1^{-1}$ 219 may de-interleave the map-detected signal. The de-spreader 221 may de-spread the de-interleaved signal. The decoder 223 may decode the de-spread signal to generate recovered data with respect to the received signal. The symbol generator 233 may generate a symbol with respect to the recovered data, through the same process as the STBC transmitter of FIG. 1.

The IMD-FDE performing unit 205 may include a multi-user interference cancellation unit 207, a linear combiner, i.e. an STBC combiner, 208, and an equalizer, i.e. a 1-tap minimum mean square error (MMSE) equalizer 213. The multi-user interference cancellation unit may cancel multi-user interference using the recovered data with respect to the received signal and output an $m^{th}$ signal block and an $(m+1)^{th}$ signal block that are sequentially transmitted from the two different transmitting antennas. The STBC combiner 209 may perform linear combination for the $m^{th}$ signal block and the $(m+1)^{th}$ signal block. The 1-tap MMSE equalizer 213 may apply two different equalization coefficients to the combined $m^{th}$ signal block and $(m+1)^{th}$ signal block to thereby perform frequency-domain equalization.

The IMD-FDE performing unit 205 may further include a re-encoder, i.e. an STBC encoder 211 that may perform STBC encoding for the recovered data. The re-encoder 211 may be included in the IMD-FDE performing unit 209, or may be provided separately from the IMD-FDE performing unit 209.

The multi-user interference cancellation unit 207 may subtract a signal contribution by another user using a frequency domain to thereby cancel the multi-user interference in the received signal. The multi-user interference cancellation unit 207 may iteratively cancel the multi-user interference using an output signal of the re-encoder 211.

The re-encoder 211 may iteratively perform STBC encoding for a symbol generated from the symbol generator 233 to thereby provide the STBC encoded symbol to the multi-user interference cancellation unit 207. The IFFT/FFT unit 215 may perform FFT for the symbol generated from the symbol generator 233 to thereby provide the FFT symbol to the re-encoder 211.

The symbol generator 233 may include a re-spreader 225, a summator 227, an interleaver 229, and a soft mapper 231. The summator 227 may summate the re-spread signal and the de-interleaved signal. The interleaver 229 may interleave the summated signal. The soft mapper 231 may perform mapping for the interleaved signal.

Hereinafter, a signal processing operation of the STBC receiver will be described based on the mathematical induction.

An $m^{th}$ sequence and an $(m+1)^{th}$ sequence sequentially received by the STBC receiver may be expressed as a vector type, as given by, $$r^m = \sum_{u=1}^{U} \sum_{i=1}^{2} H_{u,i}^{m} x_{u,i}^{m} + w^m, \quad \text{[Equation 2]}$$

$$r^{m+1} = \sum_{u=1}^{U} \sum_{i=1}^{2} H_{u,i}^{m+1} x_{u,i}^{m+1} + w^{m+1},$$

where $H_{u,i}^{j}$, $i=1,2$, $j=m,m+1$, denotes a circulant channel matrix formed between an $i^{th}$ transmitting antenna of the $u^{th}$ transmitter and the receiving antenna in a $j^{th}$ block.

$Z_u^m$ and $Z_u^{m+1}$ that are time domain receiving vectors with respect to the $u^{th}$ user among output signals of the multi-user interference cancellation unit 207 may be represented as, $$z_u^m = \sum_{i=1}^{2} H_{u,i}^{m} x_{u,i}^{m} + \sum_{u'=1, u' \neq u}^{U} \sum_{i=1}^{2} H_{u',i}^{m}(x_{u',i}^{m} - \bar{x}_{u',i}^{m}) + w^m, \quad \text{[Equation 3]}$$

$$z_u^{m+1} = \sum_{i=1}^{2} H_{u,i}^{m+1} x_{u,i}^{m+1} + \sum_{u'=1, u' \neq u}^{U} \sum_{i=1}^{2} H_{u',i}^{m+1}(x_{u',i}^{m+1} - \bar{x}_{u',i}^{m+1}) + w^{m+1},$$

where $\bar{x}_{u,i}^{m}$, $i=1,2$ denotes a mean vector provided from the decoder 223 of the up transmitter.

$\bar{x}_{u,i}^{m+1}$, $i=1,2$ may be obtained when the STBC encoder 211 performs STBC encoding for $\bar{x}_{u,i}^{m}$, $i=1,2$.

The FFT unit 203 may apply an N×N FFT matrix F to the above Equation 3 to thereby generate frequency domain symbols as given by, $$Z_u^m = F z_u^m \quad \text{[Equation 4]}$$

$$= \sum_{i=1}^{2} \Lambda_{u,i}^{m} X_{u,i}^{m} + \sum_{u'=1, u' \neq u}^{U} \sum_{i=1}^{2} \Lambda_{u',i}^{m}(X_{u',i}^{m} - \bar{X}_{u',i}^{m}) + W^m,$$

$$Z_u^{m+1} = F z_u^{m+1}$$

$$= \sum_{i=1}^{2} \Lambda_{u,i}^{m+1} X_{u,i}^{m+1} + \sum_{u'=1, u' \neq u}^{U} \sum_{i=1}^{2} \Lambda_{u',i}^{m+1}(X_{u',i}^{m+1} - \bar{X}_{u',i}^{m+1}) + W^{m+1},$$

where $\Lambda_{u,i}^{j}$, $i=1,2$, $j=m,m+1$ denotes a diagonal matrix given by $FH_{u,i}^{j}F^{-1}$ and $W^j = Fw^j$.

With respect to $k=0, 1, \ldots, N-1$ and $m=0, 2, 4, \ldots,$ Equation 1 may be represented as, $$X_{u,1}^{m+1}(k) = -X_{u,2}^{*m}(k), \text{ and } X_{u,2}^{m+1}(k) = X_{u,1}^{*m}(k). \quad \text{[Equation 5]}$$

As described above, since it may be assumed that adjacent blocks have a certain channel value in an STBC system, it is possible to obtain the relation as given by, $$H_{u,i}^{m+1} = H_{u,i}^{m} \triangleq H_{u,i} \Leftrightarrow \Lambda_{u,i}^{m+1} = \Lambda_{u,i}^{m} \triangleq \Lambda_{u,i}, \quad \text{[Equation 6]}$$

where $H^j$, $j=m,m+1$, denotes a channel value of an $j^{th}$ symbol block.

According to Equation 5 and Equation 6, Equation 4 may be expressed as a matrix, as given by, $$Z_u \triangleq \begin{bmatrix} Z_u^m \\ Z_u^{*m+1} \end{bmatrix} \quad \text{[Equation 7]}$$

$$= \begin{bmatrix} \Lambda_{u,1} & \Lambda_{u,2} \\ \Lambda_{u,2}^H & -\Lambda_{u,1}^H \end{bmatrix} \begin{bmatrix} X_{u,1}^m \\ X_{u,2}^m \end{bmatrix} +$$

$$\sum_{u'=1, u' \neq u}^{U} \begin{bmatrix} \Lambda_{u',1} & \Lambda_{u',2} \\ \Lambda_{u',2}^H & -\Lambda_{u',1}^H \end{bmatrix} \begin{bmatrix} X_{u',1}^m & \bar{X}_{u',1}^m \\ X_{u',2}^m & \bar{X}_{u',2}^m \end{bmatrix} +$$

$$\begin{bmatrix} W^m \\ W^{*m+1} \end{bmatrix}$$

$$\triangleq \Lambda_u X_u + \sum_{u'=1, u' \neq u}^{U} \Lambda_{u'}(X_{u'} - \bar{X}_{u'}) + W.$$

The linear combiner 209 may induce a linear combination from Equation 7 using a combination scheme based on an MMSE standard, and the linear combination may be given by, $$\tilde{Z}_u \triangleq \begin{bmatrix} \tilde{Z}_u^m \\ \tilde{Z}_u^{m+1} \end{bmatrix} \quad \text{[Equation 8]}$$

$$= \Lambda_u^H Z_u$$

$$= \begin{bmatrix} \tilde{\Lambda}_u & 0 \\ 0 & \tilde{\Lambda}_u \end{bmatrix} \begin{bmatrix} X_{u,1}^m \\ X_{u,2}^m \end{bmatrix} +$$

$$\sum_{u'=1, u' \neq u}^{U} \begin{bmatrix} \check{A}_{u'} & \check{B}_{u'} \\ \check{C}_{u'} & \check{D}_{u'} \end{bmatrix} \begin{bmatrix} X_{u',1}^m - \bar{X}_{u',1}^m \\ X_{u',2}^m - \bar{X}_{u',2}^m \end{bmatrix} + \Lambda_u^H W,$$

Elements of the matrix included in Equation 8 may be defined as, $$\check{A}_u = \Lambda_{u,1}^H \Lambda_{u',1} + \Lambda_{u,2} \Lambda_{u',2}^H,$$

$$\check{B}_u = \Lambda_{u,1}^H \Lambda_{u',2} - \Lambda_{u,2} \Lambda_{u',1}^H,$$

$$\check{C}_u = \Lambda_{u,2}^H \Lambda_{u',1} - \Lambda_{u,1} \Lambda_{u',2}^H = -\check{B}_u^H,$$

$$\check{D}_u = \Lambda_{u,2}^H \Lambda_{u',2} + \Lambda_{u,1} \Lambda_{u',1}^H = \check{A}_u^H, \quad \text{[Equation 9]}$$

In Equation 8 and Equation 9, $\tilde{\Lambda}_u = |\Lambda_{u,1}|^2 + |\Lambda_{u,1}|^2$ is a diagonal matrix that includes $\tilde{\Lambda}_u(k)(=|\Lambda_{u,1}(k)|^2 + |\Lambda_{u,1}(k)|^2)$ as (k, k) element.

Since the multi-user interference still exists in the output signal of the multi-user interference cancellation unit 207, an IMD-FDE scheme applied to a transmitting and receiving system with a single transmitting antenna may not be directly used for an STBC SC-FDE system of the invention.

Accordingly, the equalizer 213 may calculate an equalization coefficient according to the following process.

Output signals of the multi-user interference cancellation unit 207 may be represented as, $$\tilde{Z}_u^m = \tilde{\Lambda}_u X_{u,1}^m + \sum_{u'=1, u' \neq u}^{U} \begin{pmatrix} \check{A}_{u'}(X_{u',1}^m - \bar{X}_{u',1}^m) + \\ \check{B}_{u'}(X_{u',2}^m - \bar{X}_{u',2}^m) \end{pmatrix} + \tilde{W}^m, \quad \text{[Equation 10]}$$

-continued $$\check{Z}_u^{m+1} = \check{\Lambda}_u X_{u,2}^m + \sum_{u'=1, u' \neq u}^{U} \begin{pmatrix} -\check{B}_{u'}^H (X_{u',1}^m - \overline{X}_{u',1}^m) + \\ \check{A}_{u'}^H (X_{u',2}^m - \overline{X}_{u',2}^m) \end{pmatrix} + \check{W}^{m+1},$$

$$(\check{W}^m = [\Lambda_{u,1}^H \ \Lambda_{u,2}]W, \ \check{W}^{m+1} = [\Lambda_{u,2}^H \ -\Lambda_{u,1}]W)$$

When multiplying an IFFT matrix by $Z_u^m$ and $Z_u^{m+1}$, signal vectors $Z_u^m$ and $Z_u^{m+1}$ decoupled in the time domain may be represented as, $$\check{z}_u^m = \tilde{H}_u x_{u,1}^m + \sum_{u'=1, u' \neq u}^{U} \begin{pmatrix} A_{u'}(x_{u',1}^m - \overline{x}_{u',1}^m) + \\ B_{u'}(x_{u',2}^m - \overline{x}_{u',2}^m +) \end{pmatrix} + \tilde{w}^m,$$ [Equation 11]

$$\check{z}_u^{m+1} = \tilde{H}_u x_{u,2}^m + \sum_{u'=1, u' \neq u}^{U} \begin{pmatrix} -B_{u'}^H (x_{u',1}^m - \overline{x}_{u',1}^m) + \\ A_{u'}^H (x_{u',2}^m - \overline{x}_{u',2}^m) \end{pmatrix} + \tilde{w}^{m+1},$$

where $$A_{u'} = F^{-1} \check{A}_{u'} F, \ B_{u'} = F^{-1} \check{B}_{u'} F$$

and $$\tilde{w} = F^{-1} \check{W}^j, \ j = m, m+1.$$

Referring to Equation 10 and Equation 11, since $\check{A}_{u'}$, $\check{B}_{u'}$, $\check{C}_{u'}$ and $\check{D}_{u'}$ are diagonal matrices, $A_{u'}$, $B_{u'} C_{u'} = -B_{u'}^H$ and $D_{u'} = A_{u'}^H$ may be N×N circulant matrices. $Z_u^m$ and $Z_u^{m+1}$ may be received signal vectors of the single transmitting antenna system in which the multi-user interference is removed. Therefore, in order to induce a coefficient of a frequency-domain equalizer of the STBC system, it is possible to apply a scheme used in the single transmitting antenna system.

The equalizer 213 may calculate the equalization coefficient based on an equivalent channel and a covariance with respect to a transmitting terminal according to, $$G_{u,1}(k) = \frac{\tilde{\Lambda}_u(k)}{v_{u,1} |\tilde{\Lambda}_u(k)|^2 + \sum_{u' \neq u} \begin{pmatrix} v_{u',1} |\check{A}_{u'}(k)|^2 + \\ v_{u',2} |\check{B}_{u'}(k)|^2 \end{pmatrix} + \sigma_w^2 \tilde{\Lambda}_u(k)},$$ [Equation 12]

$$G_{u,2}(k) = \frac{\tilde{\Lambda}_u(k)}{v_{u,2} |\tilde{\Lambda}_u(k)|^2 + \sum_{u' \neq u} \begin{pmatrix} v_{u',1} |\check{B}_{u'}^H(k)|^2 + \\ v_{u',2} |\check{A}_{u'}^H(k)|^2 \end{pmatrix} + \sigma_w^2 \tilde{\Lambda}_u(k)},$$

$$k = 0, 1, \ldots, N-1,$$

where $\check{A}_u(k)$ and $\check{B}_u(k)$ denote $(k, k)$ elements of $\check{A}_u$ and $\check{B}_u$, $$v_{u,i} = \frac{1}{N} \text{trace}(V_{u,i}), \ i = 1, 2, \text{ and } V_{u,i} = \text{Cov}(x_{u,i}^m, x_{u,i}^m).$$

The STBC transmitter may perform equalization by applying different SC MMSE-FDE coefficients $G_{u,1}(k)$ and $G_{u,2}(k)$ to $\tilde{Z}_u^m$ and $\tilde{Z}_u^{m+1}$, which is different from the single transmitting antenna STBC system.

Although the channel equalization is performed by the linear combiner 209 and the equalizer 213 in the frequency domain, decision values may be obtained in the time domain. Therefore, frequency domain estimate $\{\hat{X}_{u,i}^m(k)\}_{k=0}^{N-1}$, i=1,2 may be obtained as given by, $$\hat{X}_{u,1}^m(k) = G_{u,1}^*(k) \tilde{Z}_u^m(k) + (\mu_{u,1} - G_{u,1}^*(k) \tilde{\Lambda}_u(k, k)) \overline{X}_{u,1}^m(k),$$

$$\hat{X}_{u,2}^m(k) = G_{u,2}^*(k) \tilde{Z}_u^{m+1}(k) + (\mu_{u,2} - G_{u,2}^*(k) \tilde{\Lambda}_u(k, k)) \overline{X}_{u,2}^m(k),$$ [Equation 13]

$k=0, 1, \ldots, N-1$,

Accordingly, the equalizer 213 may calculate an equalization coefficient according to a process to be described.

In Equation 13, the equalizer 213 may detect, from the $m^{th}$ signal block, a signal that is transmitted from a first antenna of the STBC transmitter (at the $m^{th}$ symbol block) and detect, from the $(m+1)^{th}$ signal block, another signal that is transmitted from a second antenna of the transmitter (at the $m^{th}$ symbol block).

In Equation 13, $\mu_{u,i}$ may be a mean value of an estimate $\{\hat{x}_{u,i}^m(k)\}_{k=0}^{N-1}$. Time domain estimate $\{\hat{x}_{u,i}^m(k)\}_{k=0}^{N-1}$, i=1,2 may be obtained from frequency domain estimate $\{\hat{X}_{u,i}^m(k)\}_{k=0}^{N-1}$, i=1,2 through the IFFT operation. The mean and variance with respect to the estimate $\{\hat{x}_{u,i}^m(k)\}_{k=0}^{N-1}$ may be represented as, $$\mu_{u,i} = \frac{1}{N} \sum_{k=0}^{N-1} (G_{u,i}^*(k) \tilde{\Lambda}_u(k, k)),$$ [Equation 14]

and $$\sigma_{u,i}^2 = \mu_{u,i} - v_{u,i} \mu_{u,i}^2, \ i = 1, 2..$$

Figure 3:
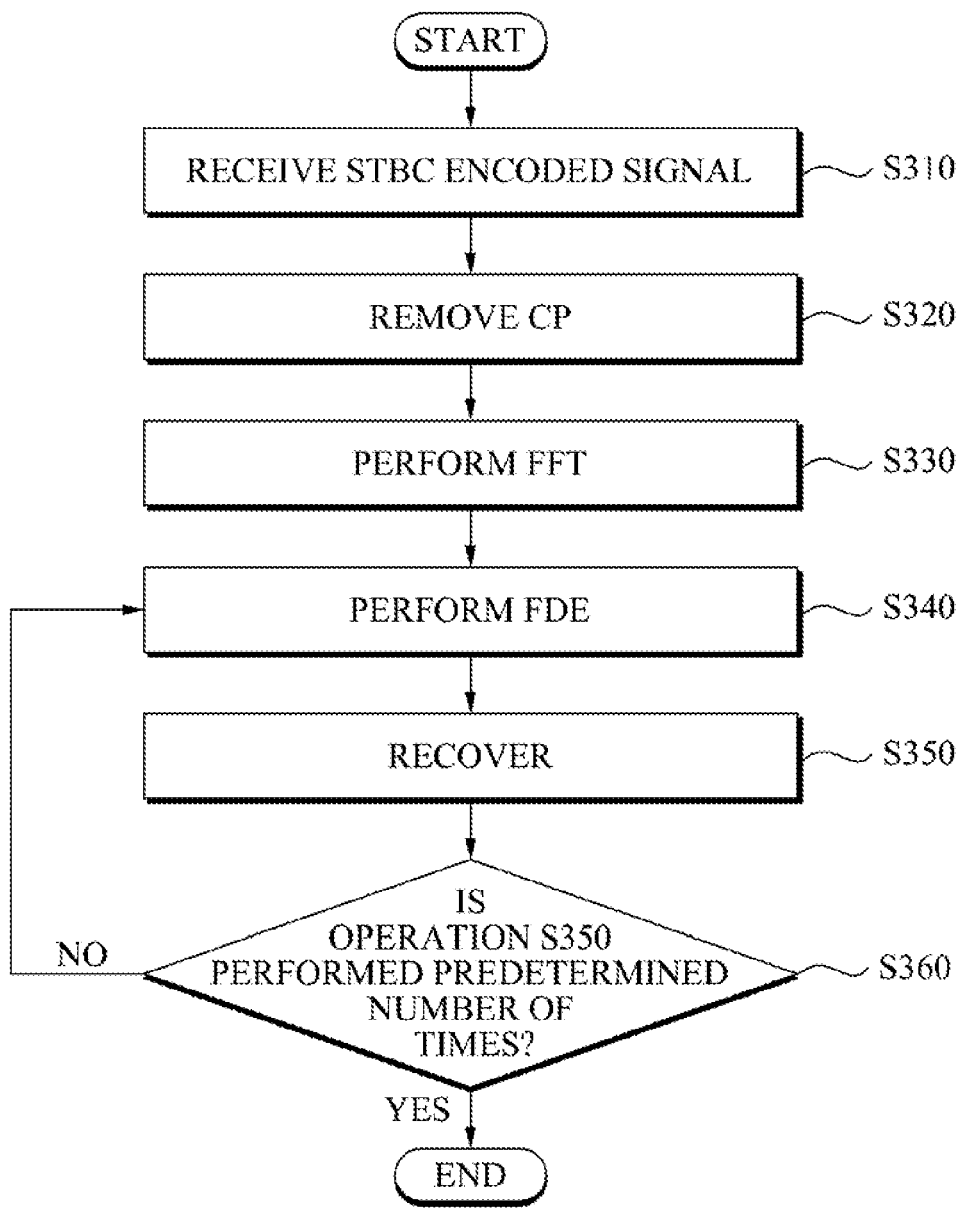
FIG. 3 is a flowchart illustrating an exemplary method of receiving an STBC signal.

FIG. 3 illustrates an exemplary method of receiving an STBC encoded signal.

Referring to FIG. 3, the exemplary method of receiving the STBC encoded signal comprises operation S310 of receiving a signal, transmitted via a single carrier from at least two different transmitting antennas, via a single receiving antenna, operation S320 of removing a CP in the received signal, operation S330 of performing FFT for the signal in which the CP is removed, operation S340 of canceling multi-user interference in the FFT signal using recovered data and applying two different equalization coefficients to the signal in which the multi-user interference is canceled to thereby detect the signal transmitted from the at least two transmitting antennas, and operation S350 of recovering transmission data from the detected signal that is transmitted from the at least two transmitting antennas.

The exemplary method of receiving the STBC encoded signal may perform Iterative Multi-user Detection. Specifically, in operation S360, it may be determined whether operation S350 is performed a predetermined number of times. When operation S350 is not performed the predetermined number of times, the exemplary method may return to operation S340.

In operation S340, the IMD-FDE performing unit 205 may perform linear combination for the signal in which the multi-user interference is removed, based on the MMSE standard and perform frequency-domain equalization by applying two different equalization coefficients to the combined frequency component.

Figure 4:
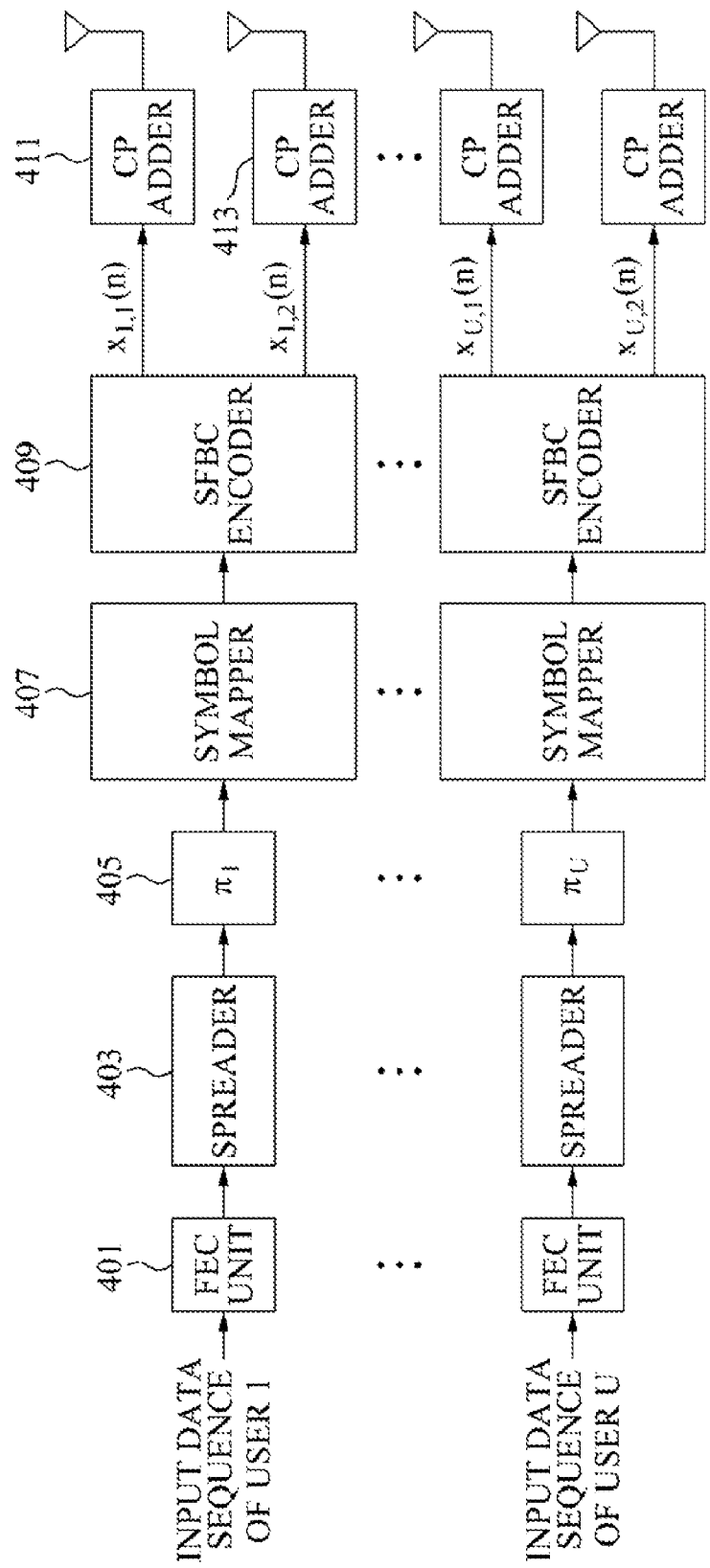
FIG. 4 is a block diagram illustrating an exemplary structure of a Space Frequency Block Coding (SFBC) transmitter.

FIG. 4 illustrates an exemplary structure of a Space Frequency Block Coding (SFBC) transmitter.

In FIG. 4, U users may perform SFBC encoding for input data sequences 1 through U using the SFBC transmitter with two transmitting antennas, respectively.

Referring to FIG. 4, the SFBC transmitter comprises an FEC unit 401, a spreader 403, an interleaver $\pi_1$ 405, a symbol mapper 407, an SFBC encoder 409, and CP adders 411 and 413. The FEC unit may perform FEC coding for the input data sequence. The spreader 403 may spread the FEC coded bits. The interleaver $\pi_1$ 405 may interleave the spread bits. The symbol mapper 407 may perform symbol mapping for the interleaved bits. The SFBC encoder 409 may perform SFBC encoding for a symbol mapped signal. The CP adders 411 and 413 may add a CP to the SFBC encoded symbol.

The input data sequence may be FEC coded and then be spread by sequence [1, −1, ..., 1, −1] with the length of S. The spread bits may be encoded into two streams associated with SFBC constellations by the SFBC encoder 409.

In the following description, $x_{u,i}(n)$ may denote the $n^{th}$ symbol that is transmitted from the $i^{th}$ antenna of the $u^{th}$ transmitter. SFBC SC-FDE symbols transmitted from the first antenna of the transmitter may be represented as, $$x_{u,1}(n) = \frac{1}{\sqrt{2}}(x_u^e(n) + W_N^{-n}x_u^o(n)), \quad \text{[Equation 15]}$$

$$n = 0, 1, \ldots, N-1,$$

where $W_N^{-n} = e^{j2\pi n/N}$.

$x_u^e(n)$ and $x_u^o(n)$ may be given by, $$x_u^e(n) = \sqrt{\frac{2}{N}} \sum_{v=0}^{N/2-1} X_{u,1}(2v)W_{N/2}^{-nv},$$

and $$x_u^o(n) = \sqrt{\frac{2}{N}} \sum_{v=0}^{N/2-1} X_{u,1}(2v+1)W_{N/2}^{-nv}.$$

$x_u^e(n)$ and $x_u^o(n)$ are periodic values with the period of N/2.

The symbol transmitted from the second antenna of the SFBC transmitter may be calculated like the following Equation 16, using $(x^*_u((-n)_N) \Leftrightarrow X^*_u(k), n, k=0, 1, \ldots, N-1)$ corresponding to a DFT symmetric characteristic, $$x_{u,2}(n) = \frac{1}{\sqrt{2}}[-x_u^{o*}((-n)_{N/2}) + W_N^{-n}x_u^{e*}((-n)_{N/2})] \quad \text{[Equation 16]}$$

The CP adders 411 and 413 may add a CP with the length of L to a front end of a transmission block in order to avoid interblock interference. Transmission blocks with the added CP may be transmitted from two antennas via a channel. It is assumed that the channel frequency response between adjacent subcarriers is the same.

Figure 5:
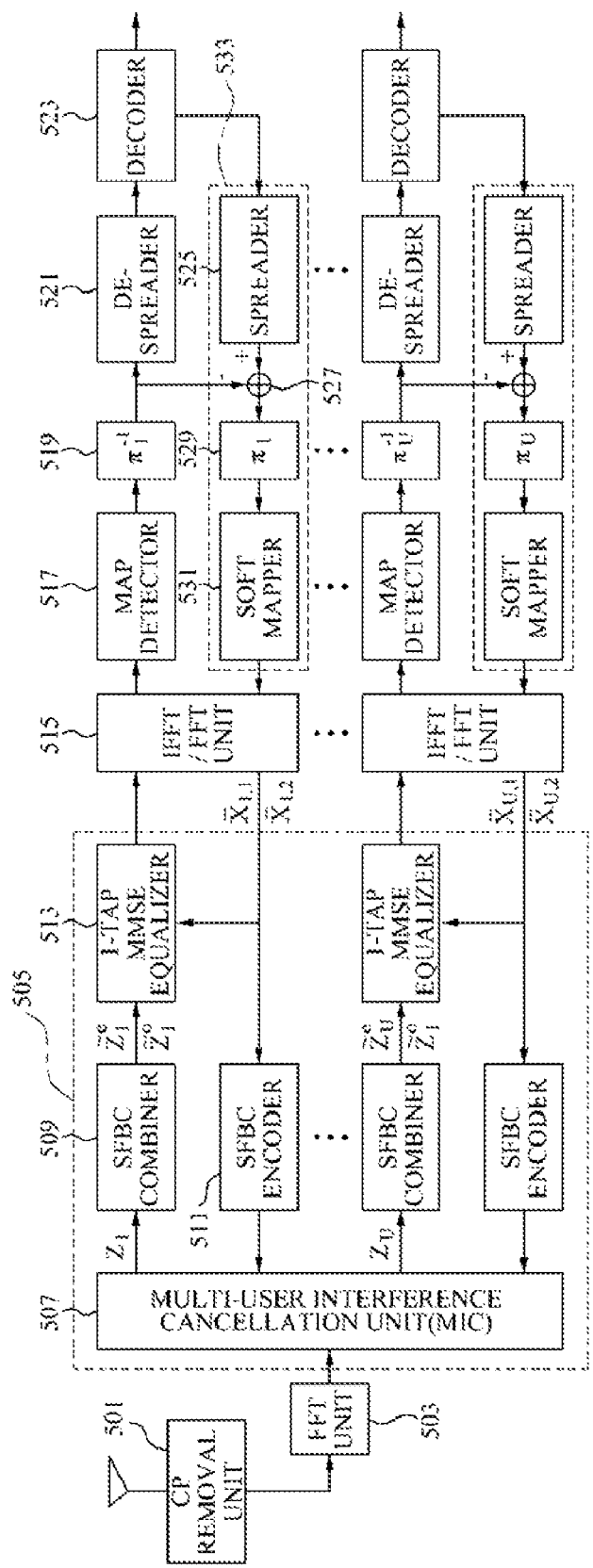
FIG. 5 is a block diagram illustrating an exemplary structure of an SFBC receiver.

FIG. 5 illustrates an exemplary structure of an SFBC receiver.

Referring to FIG. 5, the SFBC receiver comprises a CP removal unit 501, an FFT unit 503, an Interactive Multi-user Detection-Frequency Domain Equalization (IMD-FDE) performing unit 505, an inverse fast Fourier transform (IFFT)/FFT unit 515, a map detector 517, a de-interleaver $\pi_1^{-1}$ 519, a de-spreader 521, and a decoder 523.

The CP removal unit 501 may remove a CP in a received signal. The FFT unit 503 may perform FFT for the signal in which the CP is removed. The IMD-FDE performing unit 505 may remove multi-user interference in the FFT signal to detect transmission data. The IFFT/FFT unit 515 may perform IFFT for the detected transmission data. The map detector 517 may detect a symbol mapping from the IFFT signal. The de-interleaver $\pi_1^{-1}$ 519 may de-interleave the map-detected signal. The de-spreader 521 may de-spread the de-interleaved signal. The decoder 523 may decode the de-spread signal to generate recovered data with respect to the received signal. The symbol generator 533 may generate a symbol with respect to the recovered data, through the same process as the SFBC transmitter of FIG. 4.

The IMD-FDE performing unit 505 may include a multi-user interference cancellation unit 507, a linear combiner, i.e. an SFBC combiner 509, and an equalizer, i.e. a 1-tap MMSE equalizer 513. The multi-user interference cancellation unit 507 may cancel multi-user interference and output an even frequency component and an odd frequency component that are transmitted from two different transmitting antennas. The SFBC combiner 509 may perform linear combination for the even frequency component and the odd frequency component. The 1-tap MMSE equalizer 513 may apply two different equalization coefficients to the combined even frequency component and odd frequency component to thereby perform frequency-domain equalization.

The IMD-FDE performing unit 505 may further include a re-encoder, i.e. an SFBC encoder 511 that may perform SFBC encoding for the recovered data. The re-encoder 511 may be included in the IMD-FDE performing unit 509, or may be provided separately from the IMD-FDE performing unit 509.

The multi-user interference cancellation unit 507 may subtract a signal contribution by another user using a frequency domain to thereby cancel the multi-user interference in the received signal. The multi-user interference cancellation unit 507 may iteratively cancel the multi-user interference using an output signal of the re-encoder 511.

The re-encoder 511 may iteratively perform SFBC encoding for a symbol generated from the symbol generator 533 to thereby provide the SFBC encoded symbol to the multi-user interference cancellation unit 507. The IFFT/FFT unit 515 may perform FFT for the symbol generated from the symbol generator 533 to thereby provide the fast Fourier transformed symbol to the re-encoder 511.

The symbol generator 533 may include a re-spreader 525, a summator 527, an interleaver 529, and a soft mapper 531. The summator 527 may summate the re-spread signal and the de-interleaved signal. The interleaver 529 may interleave the summated signal. The soft mapper 531 may perform mapping for the interleaved signal.

Hereinafter, a signal processing operation of the SFBC receiver will be described based on the mathematical induction.

A sequence received by the SFBC receiver of FIG. 5 may be expressed as a vector type, as given by, $$r = \sum_{u=1}^{U} \sum_{i=1}^{2} H_{u,i}x_{u,i} + w \quad \text{[Equation 17]}$$

where $H_{u,i}$, $i=1,2$ denotes a circulant channel matrix formed between the $i^{th}$ transmitting antenna of the $u^{th}$ transmitter and the receiving antenna.

Time domain receiving vector with respect to the $u^{th}$ user among output signals of the multi-user interference cancellation unit 507 may be represented as, $$Z_u = \sum_{i=1}^{2} \Lambda_{u,i} X_{u,i} + \sum_{u' \neq u} \sum_{i=1}^{2} \Lambda_{u',i}(X_{u',i} - \overline{X}_{u',i}) + W \quad \text{[Equation 18]}$$

where $\overline{x}_{u,i}^{m+1}$, $i=1,2$, $F_N$ denotes an N×N FFT matrix, $\overline{x}_{u,i}$ denotes a mean vector that may be obtained by performing SFBC encoding for an output value of the decoder 523 with respect to the $u^{th}$ transmitter according to Equation 15 and Equation 16, $\Lambda_{u,i}$, $i=1,2$ denotes a diagonal matrix given by $F_N H_{u,i} F_N^{-1}$, $i=1, 2$, and $W = F_N w$.

With respect to $k=0, 1, \ldots, N/2-1$, Equation 15 and Equation 16 may be represented as, $$X_{u,2}(2k) = -X^*_{u,1}(2k+1), \text{ and } X_{u,2}(2k+1) = X^*_{u,1}(2k) \quad \text{[Equation 19]}$$

When it is assumed that the channel frequency response between adjacent subcarriers is the same, an SFBC system may accomplish the relation as given by, $$\Lambda_{u,i}(2k) \approx \Lambda_{u,i}(2k+1), i=1, 2.$$

Accordingly, Equation 18 may be represented as, $$Z'_{u,k} \triangleq [Z_u(2k) \ Z_u^*(2k+1)]^T \quad \text{[Equation 20]}$$
$$= \Lambda'_{u,k} X'_{u,k} + \sum_{u' \neq u} \Lambda'_{u',k}(X'_{u',k} - \overline{X}'_{u',k}) + W'_k,$$

$$k = 0, 1, \ldots N/2 - 1.$$

where $$\Lambda'_{u,k} = \begin{bmatrix} \Lambda_{u,1}(2k) & -\Lambda_{u,2}(2k) \\ \Lambda^*_{u,2}(2k) & \Lambda^*_{u,1}(2k) \end{bmatrix},$$

$$X'_{u,k} = [X_{u,1}(2k) \ X^*_{u,1}(2k+1)]^T,$$

and $$W'_{u,k} = [W_u(2k) \ W^*_u(2k+1)]^T.$$

The linear combiner 509 may induce linear combination from Equation 20 using a combination scheme based on an MMSE standard, and the linear combination may be give by, $$\tilde{Z}_{u,k} \triangleq [\tilde{Z}_u(2k) \ \tilde{Z}_u(2k+1)]^T \quad \text{[Equation 21]}$$
$$= \Lambda'^H_{u,k} Z'_{u,k}$$
$$= \tilde{\Lambda}_{u,k} X'_{u,k} + \sum_{u' \neq u} \tilde{E}_{u',k}(X'_{u',k} - \overline{X}'_{u',k}) +$$
$$\Lambda'^H_{u,k} W'_k,$$

$$k = 0, 1, \ldots, N/2 - 1,$$

where $$E_{u',k} = \begin{bmatrix} \check{A}_{u',k} & \check{B}_{u',k} \\ -\check{B}^*_{u',k} & \check{A}^*_{u',k} \end{bmatrix},$$

$$\check{A}_{u',k} = \Lambda^*_{u,1}(2k)\Lambda_{u',1}(2k) + \Lambda_{u,2}(2k)\Lambda^*_{u',2}(2k)$$

$$\check{B}_{u',k} = -\Lambda^*_{u,1}(2k)\Lambda_{u',2}(2k) + \Lambda_{u,2}(2k)\Lambda^*_{u',1}(2k),$$

and $$\tilde{\Lambda}_{u,k} = \text{Diag}(\tilde{\Lambda}(2k), \tilde{\Lambda}(2k)).$$

$$\tilde{\Lambda}_u(2k)(= |\Lambda_{u,1}(2k)|^2 + |\Lambda_{u,2}(2k)|^2)$$

denotes a value that is obtained by squaring $2k^{th}$ DFT coefficients with respect to the channel frequency response of first and second transmitting antennas of the SFBC transmitter and adding the result of squaring.

$\tilde{Z}_u = [\tilde{Z}_{u,0}^T \ \tilde{Z}_{u,1}^T \ldots \tilde{Z}_{u,N/2-1}^T]^T$ of Equation 21 may be expressed as an N×1 vector matrix, as given by, $$\tilde{Z}_u = \tilde{\Lambda}_u X'_u + \sum_{u' \neq u} E_{u'}(X'_{u'} - \overline{X}'_{u'}) + \tilde{W}, \quad \text{[Equation 22]}$$

where $\tilde{\Lambda}_u = \text{Diag}(\tilde{\Lambda}_{u,0}, \tilde{\Lambda}_{u,1}, \ldots, \tilde{\Lambda}_{u,N/2-1})$, $X'_u = [X'^T_{u,0} X'^T_{u,1} \ldots X'^T_{u,N/2-1}]^T$, $E_{u'} = \text{Diag}(E_{u',0}, E_{u',1}, \ldots, E_{u',N/2-1})$, and $\tilde{W} = \Lambda'^H_u W'$.

The multi-user interference still exists in the output signal $\tilde{Z}_u$ of the multi-user interference cancellation unit 507. Since the matrix $E_{u'}$ includes off-diagonal terms, an IMD-FDE scheme applied to the transmitting and receiving system with a single transmitting antenna may not be directly used for an SFBC SC-FDE system of the invention.

Accordingly, the equalizer 513 may calculate an equalization coefficient according to a following process.

$\tilde{Z}_u$ may be expressed as two (N/2)×1 vectors as given by, $$\tilde{Z}_u^e = \tilde{\Lambda}_u^e X_{u,1}^e + \sum_{u' \neq u}\left(\check{A}_{u'}(X^e_{u',1} - \overline{X}^e_{u',1}) + \check{B}_{u'}(X^{o*}_{u',1} - \overline{X}^{o*}_{u',1})\right) + \tilde{W}^e,$$

$$\tilde{Z}_u^o = \tilde{\Lambda}_u^o X_{u,1}^{o*} + \sum_{u' \neq u}\left(-\check{B}^H_{u'}(X^e_{u',1} - \overline{X}^e_{u',1}) + \check{A}^H_{u'}(X^{o*}_{u',1} - \overline{X}^{o*}_{u',1})\right) + \tilde{W}^o,$$

where $\check{A}_{u'} = \text{Diag}(\check{A}_{u',0}, \check{A}_{u',1}, \ldots, \check{A}_{u',N/2-1})$ and $\check{B}_{u'} = \text{Diag}(\check{B}_{u',0}, \check{B}_{u',1}, \ldots, \check{B}_{u',N/2-1})$.

When multiplying IFFT matrix $F_{N/2}^{-1}$ by $\tilde{Z}_u^e$ and $\tilde{Z}_u^o$, $\tilde{Z}_u^e$ and $\tilde{Z}_u^o$ decoupled in the time domain may be represented as, $$\tilde{z}_u^e = \tilde{H}_u^e x_u^e + \sum_{u' \neq u}(A_{u'}(x_{u'}^e - \overline{x}_{u'}^e) + B_{u'}(x_{u'}^o - \overline{x}_{u'}^o)) + \tilde{w}^e, \quad \text{[Equation 23]}$$

$$\tilde{z}_u^{o*} = \tilde{H}_u^o x_u^{o*} - \sum_{u' \neq u}(-B^H_{u'}(x_{u'}^e - \overline{x}_{u'}^e) + A^H_{u'}(x_{u'}^{o*} - \overline{x}_{u'}^{o*})) + \tilde{w}^o,$$

where $A_{u'} = F_{N/2}^{-1}\check{A}_{u'}F_{N/2}$, $B_{u'} = F_{N/2}^{-1}\check{B}_{u'}F_{N/2}$, and $\tilde{w}^j = F_{N/2}^{-1}\tilde{W}^j$, j=e,o.

Since $\check{A}_{u'}$ and $\check{B}_{u'}$ are diagonal matrices, it can be known that $A_{u'}$ and $B_{u'}$ are N/2 circulant matrices. Also, $\tilde{Z}_u^e$ and $\tilde{Z}_u^o$ may be regarded as received signal vectors of the single transmitting antenna system in which the multi-user interference is removed. Therefore, in order to induce a coefficient of a frequency-domain equalizer of the SFBC system, it is possible to apply a scheme used in the single transmitting antenna system.

The equalizer 513 may calculate the equalization coefficient based on an equivalent channel and a covariance with respect to an even frequency component and an odd frequency component according to, $$G_u^e(k) = \frac{\check{A}_u(2k)}{v_u^e |\check{A}_u(2k)|^2 + \sum_{u' \neq u} \left( \begin{array}{c} v_{u'}^e |\check{A}_{u'}(k)|^2 + \\ v_{u'}^o |\check{B}_{u'}(k)|^2 \end{array} \right) + \sigma_w^2 \check{A}_u(2k)},$$ [Equation 24]

$$G_u^o(k) = \frac{\check{A}_u(2k)}{v_u^o |\check{A}_u(2k)|^2 + \sum_{u' \neq u} \left( \begin{array}{c} v_{u'}^e |\check{B}_{u'}(k)|^2 + \\ v_{u'}^o |\check{A}_{u'}(k)|^2 \end{array} \right) + \sigma_w^2 \check{A}_u(2k)},$$

$$k = 0, 1, \ldots, N/2 - 1,$$

where $\check{A}_u(k)$ and $\check{B}_u(k)$ denote $(k, k)$ elements of $\check{A}_u$ and $\check{B}_u$, $$v_u^j = \frac{1}{N} \text{trace}(V_u^j), j = e, o,$$

and $$V_u^j = \text{Cov}(x_u^j, x_u^j).$$

The SFBC transmitter may perform equalization by applying different SC MMSE-FDE coefficients $G_u^e(k)$ and $G_u^o(k)$ to $\tilde{Z}_u^e$ and $\tilde{Z}_u^o$, which is different from the single transmitting antenna SFBC system.

Although the channel equalization is performed by the linear combiner 509 and the equalizer 513 in the frequency domain, decision values may be obtained in the time domain. Therefore, frequency domain estimate $\{\hat{X}_u^j(k)\}_{k=0}^{N/2-1}$, j=e,o y may be obtained as give by, $$\hat{X}_u^e(k) = G_u^{e*}(k)\tilde{Z}_u^e(k) + (\mu_u^e - G_u^{e*}(k)\check{A}_u(2k))\tilde{X}_u^e(k),$$

$$\hat{X}_u^o(k) = G_u^{o*}(k)\tilde{Z}_u^o(k) + (\mu_u^o - G_u^{o*}(k)\check{A}_u(2k))\tilde{X}_u^o(k),$$ [Equation 25]

In Equation 25, the equalizer may detect, from the even frequency component, an even frequency component and detect, from the odd frequency component, an odd frequency component.

In Equation 25, $\mu_u^j$ may be a mean value of an estimate $\{\hat{x}_u^j(k)\}_{k=0}^{N/2-1}$. Time domain estimate $\{\hat{x}_u^j(k)\}k=0^{N/2-1}$, j=e,o may be obtained from frequency domain estimate $\{\hat{X}_u^j(k)\}_{k=0}^{N/2-1}$, j=e,o through the IFFT operation. The mean and variance with respect to the estimate $\{\hat{x}_u^j(k)\}_{k=0}^{N/2-1}$ may be represented as, $$\mu_u^j = \frac{2}{N} \sum_{k=0}^{N/2-1} (G_u^{j*}(k)\check{A}_u(2k)),$$ [Equation 26]

and $$(\sigma_u^j)^2 = \mu_u^j - v_u^j (\mu_u^j)^2$$

Figure 6:
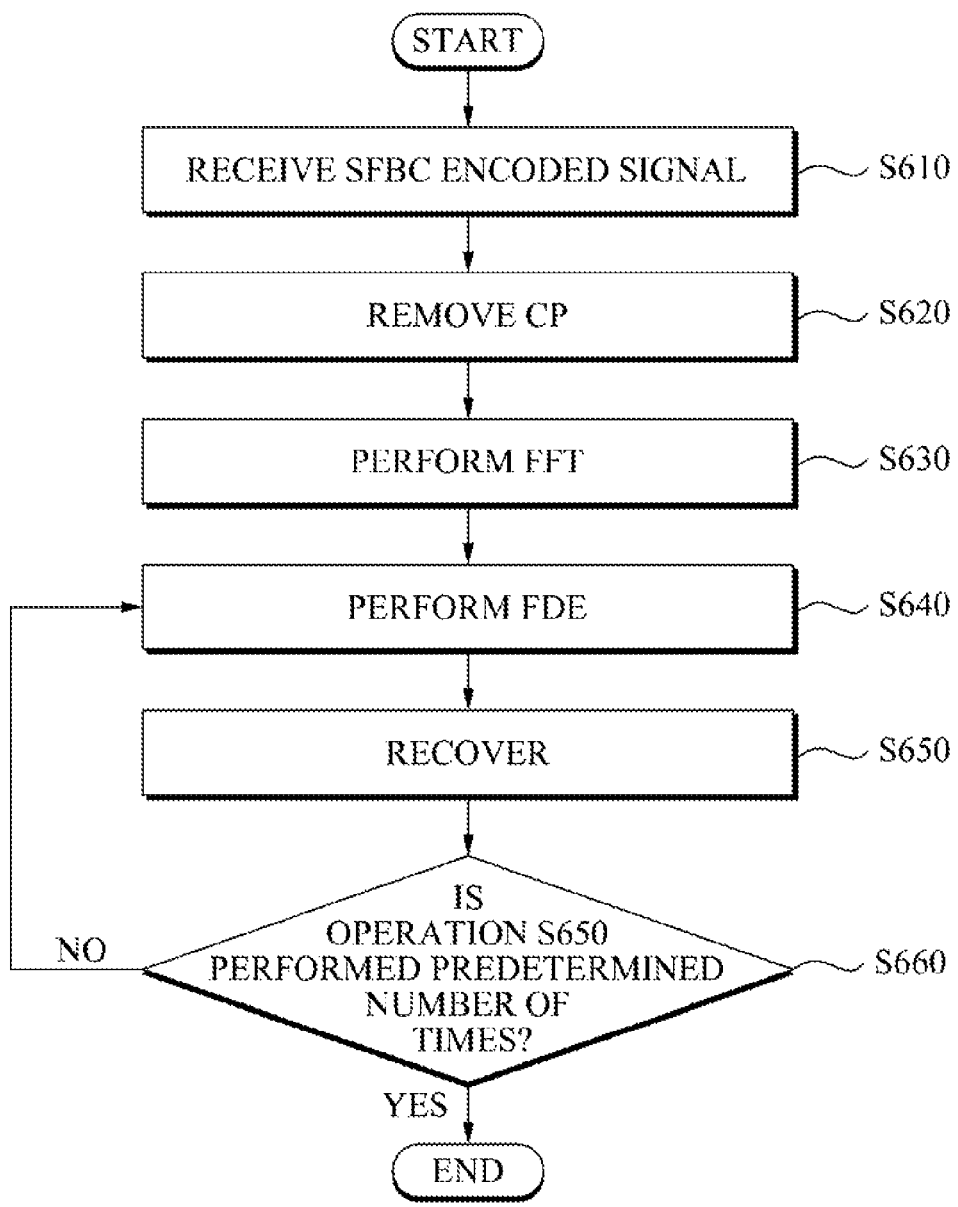
FIG. 6 is a flowchart illustrating an exemplary method of receiving an SFBC signal.

FIG. 6 illustrates an exemplary method of receiving an SFBC encoded signal.

Referring to FIG. 6, the exemplary method of receiving the SFBC encoded signal comprises operation S610 of receiving a signal, transmitted via a single carrier from at least two different transmitting antennas, using a single receiving antenna, operation S620 of removing a CP in the received signal, operation S630 of performing FFT for the signal in which the CP is removed, operation S640 of canceling multi-user interference in the fast Fourier transformed signal using recovered data and applying different equalization coefficients to the signal in which the multi-user interference is canceled to thereby detect an even frequency component and an odd frequency component, and operation S650 of recovering transmission data from the detected even frequency component and odd frequency component.

The exemplary method of receiving the SFBC encoded signal may perform Iterative Multi-user Detection. Specifically, in operation S660, it may be determined whether operation S650 is performed a predetermined number of times. When operation S650 is not performed the predetermined number of times, the exemplary method may return to operation S640.

In operation S640, the IMD-FDE performing unit 505 may perform linear combination for the signal in which the multi-user interference is removed, based on the MMSE standard and perform frequency-domain equalization by applying two different equalization coefficients to the combined frequency component.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to receive a Space-Time Block Coding (STBC) encoded signal, the apparatus comprising:
a multi-user interference cancellation unit configured to subtract a signal contribution by another user in a received signal based on recovered data with respect to the received signal, to output a first signal and a second signal that are sequentially transmitted from two transmitting antennas;
a linear combiner configured to perform linear combination of the first signal and the second signal; and
an equalizer configured to apply different equalization coefficients to the combined first signal and the second signal, respectively, to perform frequency-domain equalization and to generate transmission data, the recovered data being generated based on the transmission data.

2. The apparatus of claim 1, further comprising:
a re-encoder configured to perform STBC encoding based on the recovered data to generate and provide an STBC encoded signal to the multi-user interference cancellation unit.

3. The apparatus of claim 1, wherein the equalizer is further configured to:
detect, from the first signal, a signal transmitted from a first antenna of a transmitter, and detect, from the second signal, another signal transmitted from a second antenna of the transmitter, based on the different equalization coefficients.

4. The apparatus of claim 1, wherein the equalizer is further configured to:
calculate the different equalization coefficients based on an equivalent channel and a covariance with respect to a transmitter.

5. The apparatus of claim 1, wherein the first signal and the second signal are two consecutive signal blocks.

6. The apparatus of claim 1, further comprising:
a decoder configured to generate the recovered data based on the transmission data; and
a re-encoder configured to perform STBC encoding based on the recovered data to generate and provide an STBC encoded signal to the multi-user interference cancellation unit,
wherein the multi-user interference cancellation unit is further configured to subtract the signal contribution by the other user in the received signal based on the STBC encoded signal, to output the first signal and the second signal.

7. The apparatus of claim 6, further comprising:
a symbol generator configured to generate a symbol based on the recovered data; and
a fast Fourier transform (FFT) unit configured to perform FFT on the symbol,
wherein the re-encoder is further configured to perform the STBC encoding on the fast Fourier transformed symbol to generate and provide the STBC encoded signal to the multi-user interference cancellation unit.

8. A method of receiving a Space-Time Block Coding (STBC) encoded signal, the method comprising:
removing a cyclic prefix (CP) in a received signal;
performing fast Fourier transform (FFT) on the received signal in which the CP is removed;
subtracting a signal contribution by another user in the fast Fourier transformed signal based on recovered data with respect to the received signal, to output a first signal and a second signal that are sequentially transmitted from two transmitting antennas;
applying different equalization coefficients to the first signal and the second signal, respectively, to perform frequency-domain equalization and to generate a resulting signal; and
recovering transmission data from the resulting signal, the recovered data being generated based on the transmission data.

9. The method of claim 8, further comprising:
performing linear combination of the first signal and the second signal based on a minimum mean square error (MMSE) standard; and
applying the different equalization coefficients to the combined first signal and the second signal, respectively to perform the frequency-domain equalization and generate the resulting signal.

10. The method of claim 8, further comprising:
determining whether the recovering of the transmission data is performed a predetermined number of times; and
when the recovering of the transmission data is not performed the predetermined number of times, returning to the subtracting of the signal contribution.

11. The method of claim 8, wherein the first signal and the second signal are two consecutive signal blocks.

12. An apparatus configured to receive a Space-Frequency Block Coding (SFBC) encoded signal, the apparatus comprising:
a multi-user interference cancellation unit configured to subtract a signal contribution by another user in a received signal based on recovered data with respect to the received signal, to output an even frequency component and an odd frequency component that are transmitted from two different transmitting antennas;
a linear combiner configured to perform linear combination of the even frequency component and the odd frequency component; and
an equalizer configured to apply different equalization coefficients to the combined even frequency component and the odd frequency component, respectively, to perform frequency-domain equalization and to generate transmission data, the recovered data being generated based on the transmission data.

13. The apparatus of claim 12, further comprising:
a re-encoder configured to perform SFBC encoding based on the recovered data to generate and provide an SFBC encoded signal to the multi-user interference cancellation unit.

14. The apparatus of claim 12, wherein the equalizer is further configured to:
detect, from the even frequency component, an even frequency component of a first antenna of a transmitter, and detect, from the odd frequency component, an odd frequency component of a second antenna of the transmitter, based on the different equalization coefficients.

15. The apparatus of claim 12, wherein the equalizer is further configured to:
calculate the different equalization coefficients based on an equivalent channel and a covariance with respect to the even frequency component and the odd frequency component.

16. The apparatus of claim 12, wherein the even frequency component and the odd frequency component are two consecutive signal blocks.

17. A method of receiving a Space-Frequency Block Coding (SFBC) encoded signal, the method comprising:
removing a cyclic prefix (CP) in a received signal;
performing fast Fourier transform (FFT) on the received signal in which the CP is removed;
subtracting a signal contribution by another user in the fast Fourier transformed signal based on recovered data with respect to the received signal, to output an even frequency component and an odd frequency component that are transmitted from two different transmitting antennas;
applying different equalization coefficients to the even frequency component and the odd frequency component, respectively, to perform frequency-domain equalization and to generate a resulting signal; and recovering transmission data from the resulting signal, the recovered data being generated on the transmission data.

18. The method of claim 17, further comprising:

performing linear combination of the even frequency component and the odd frequency component based on a minimum mean square error (MMSE) standard; and applying the different equalization coefficients to the combined even frequency component and the odd frequency component, respectively, to perform the frequency-domain equalization and to generate the resulting signal.

19. The method of claim 17, further comprising:

determining whether the recovering of the transmission data is performed a predetermined number of times; and when the recovering of the transmission data is not performed the predetermined number of times, returning to the subtracting of the signal contribution.

20. The method of claim 17, wherein the even frequency component and the odd frequency component are two consecutive signal blocks.

* * * * *